United States Patent [19]

Ward et al.

[11] Patent Number: 5,367,670
[45] Date of Patent: Nov. 22, 1994

[54] COMPUTER SYSTEM MANAGER FOR MONITORING EVENTS AND OPERATING PARAMETERS AND GENERATING ALERTS

[75] Inventors: Ronald G. Ward, Houston; Scott C. Farrand, Tomball; Thomas J. Hernandez, Houston; Ronald A. Neyland, Spring; Richard A. Stupek, Houston; James E. Barron, Spring; Cheryl X. Chen, Tomball; Lih-Juan L. Danielson, Tomball; Richard P. Mangold, Tomball; Mitchell R. Wiley, Spring; Andrew J. Miller, Houston; Said S. Saadeh; Paul R. Fulton, both of Plano; Richard A. Kunz, Garland; Arthur D. Heald; Dinesh K. Sharma, both of Plano, all of Tex.

[73] Assignee: Compaq Computer Corporation, Houston, Tex.

[21] Appl. No.: 192,072

[22] Filed: Feb. 4, 1994

Related U.S. Application Data

[63] Continuation of Ser. No. 720,259, Jun. 24, 1991, abandoned.

[51] Int. Cl.⁵ ............ G06F 11/30; G06F 11/00; G06F 13/10
[52] U.S. Cl. .............. 395/575; 395/700; 395/200; 364/DIG. 1; 364/221.7; 364/241.2; 364/241.4; 364/264; 364/264.2; 364/265; 364/266.6; 364/285
[58] Field of Search .............. 395/650, 575; 371/19

[56] References Cited

U.S. PATENT DOCUMENTS

| | | | |
|---|---|---|---|
| 4,495,568 | 1/1985 | Gilbert et al. | 364/200 |
| 4,780,821 | 10/1988 | Crossley | 364/200 |
| 4,916,441 | 4/1990 | Gombrich | 340/712 |
| 5,099,420 | 3/1992 | Barlow et al. | 395/325 |
| 5,163,151 | 11/1992 | Bronikowski et al. | 395/725 |
| 5,198,805 | 3/1993 | Whiteside et al. | 340/825.06 |

FOREIGN PATENT DOCUMENTS

| | | |
|---|---|---|
| 0247605 | 12/1987 | European Pat. Off. |
| WO88/06822 | 9/0788 | WIPO |

OTHER PUBLICATIONS

Coffin et al., "Enhanced Collection and Recording of Computer System Hardware/Software Event Trace Data and System Error Data:", *IBM Technical Disclosure Bulletin*, vol. 27, No. 8, pp. 4669–4670 (Jan., 1985).

Primary Examiner—Kevin A. Kriess
Assistant Examiner—J. Grizzley Backenstose
Attorney, Agent, or Firm—Konneker Bush Hitt & Chwang

[57] ABSTRACT

A system manager for a computer system. The system manager transparently monitors signals transferred between computer system components along a system bus and stores objects related to the monitored signals in an object space. Information related to operating conditions within the system can then be provided from the object space. Later, the object space can be updated and the updated object space used to provide updated information regarding the operating conditions of the system.

22 Claims, 5 Drawing Sheets

COMPUTER SYSTEM MANAGER FOR MONITORING EVENTS AND OPERATING PARAMETERS AND GENERATING ALERTS

This is a continuation of application Ser. No. 07/720,259, filed Jun. 24, 1991, now abandoned.

CROSS REFERENCE TO RELATED APPLICATIONS

This application is related to co-pending U.S. patent ppplication Ser. Nos. 07/719,240 entitled INNATE BUS MONITORING SYSTEM FOR COMPUTER SYSTEM MANAGER, 07/720,258 entitled IN-BAND/OUT-OF-BAND ALERT DELIVERY SYSTEM FOR COMPUTER SYSTEM MANAGER, 07/719/243 entitled REMOTE CONSOLE EMULATOR FOR COMPUTER SYSTEM MANAGER, and 07/719,394 entitled POWER SUPPLY FOR COMPUTER SYSTEM MANAGER, all of which were filed on even date herewith, assigned to the assignee of the present invention and hereby incorporated by reference as if reproduced in their entirety.

BACKGROUND OF THE INVENTION

1. Field Of the Invention

The invention relates to a manager for a computer system, and, more particularly, to a computer system manager which innately monitors and processes objects indicative of computer system performance and actual and/or potential computer system failures, determines alert conditions based upon the innately monitored and processed objects, reports alert conditions in either an in-band or out-of-band mode and provides for corrective action to be taken from a remote location

2. Description of Related Art

The desire to share computer resources has motivated the development and continuing improvement of computer networks. One such computer network is generally referred to as a local area network (or "LAN"). A LAN is a system of computer hardware and software that links components such as computers, printers and other peripherals into a network suitable for transmission between various ones of the linked components located in relative proximity to each other, for example in different offices in a building, or in different buildings situated near one another. Similar to a LAN is a wide area network (or "WAN"). A WAN differs from a LAN in that a telephone network is also required to link at least some of the components included in the network to the remainder of the network components.

Various types of network operating systems are in existence today. They include the NetWare system manufactured by Novell, Inc. of Provo, Utah, the VINES system manufactured by Banyan, and the LAN Manager system manufactured by Microsoft Corporation of Redmond, Wash. While such network operating systems often include a network manager, the network manager included in such systems have typically relies upon the network operating system to provide data to the network manager for performing network management functions. Since network managers have been forced to rely upon data transmitted by the network, prior network managers have focussed on analyzing the health of the network and have not been particularly well suited to analyze the health of the components of the network.

Thus, of the five functional areas of network management (configuration, fault analysis, accounting, performance and security) recognized by the OSI/Network Management Forum, network managers have been best equipped to performing configuration and security management. Network managers can also provide limited fault analysis, but, in most cases, only after failure has occurred. Recently, the development of larger networks, both LAN and WAN, which include multiple printer, communication, database, and file server locations have been contemplated. This drive towards combining increasing numbers of computer components into a single network, has led to an increased demand for greater management capabilities. While, in the past, failure alerts may have been satisfactory, there is an increasing demand for information that will lead to failure whereby potential failures may be reported in sufficient time to allow for corrective action before an actual failure occurs. In addition to this increased demand for information that will lead to failure, the capability of real-time analysis of the performance of a computer system is also seen as a highly desirable management capability, particularly in the development of larger, multiple file server networks which will challenge minicomputers and mainframes for larger scale applications. Furthermore, as many of such networks will utilize a WAN configuration, the need to be able to manage the network from a remote console is of increased importance. Total reliance on local management capabilities would be a significant detriment to such systems since at least one major component of the systems would likely be remotely located with respect to the remainder of the system, thereby producing a network unable to manage the entire system from a single management console.

SUMMARY OF THE INVENTION

In a first embodiment, the present invention is of a computer network comprising a file server having a computer system installed therein, a computer station and a network bus connecting the console to the file server. A network operating system/network manager controls and manages information transfers between the file server and the console and a system manager manages the computer system board by monitoring signals transferred along the system bus, determining alert conditions based upon the monitored signals and generating alerts based upon the determined alert conditions. In one aspect of this embodiment of the invention, power supplied to the system manager is monitored and also used to manage the system. In another aspect, the system operating temperate is used to manage the system and, in still another aspect, network management information is also used to manage the system.

In another embodiment, the present invention is of a manager for a computer system which comprises means for monitoring information transfers along the computer system bus, a processor for determining alert conditions based upon the monitored information transfers, a console for receiving alerts from the processor, and means for transferring the alerts generated by the processor to the console. In alternate aspects of this embodiment of the invention, the monitored information transfers may be the level of voltage supplied to the system manager or the temperature at which the system manager operates.

In still another embodiment, the present invention is of a system manager for a computer system which comprises means for passively monitoring signals transferred between computer system components along a system bus and an object space for storing objects related to the passively monitored signals and providing information related to operating conditions within the system. In one aspect of this embodiment, means for updating the object space based upon additional signals being passively monitored during transfer along the system bus are also provided.

BRIEF DESCRIPTION OF THE DRAWINGS

The invention may be better understood and its numerous objects, features and advantages become apparent to those skilled in the art by referencing the accompanying drawing in which.

DETAILED DESCRIPTION OF A PREFERRED EMBODIMENT

Figure 1:
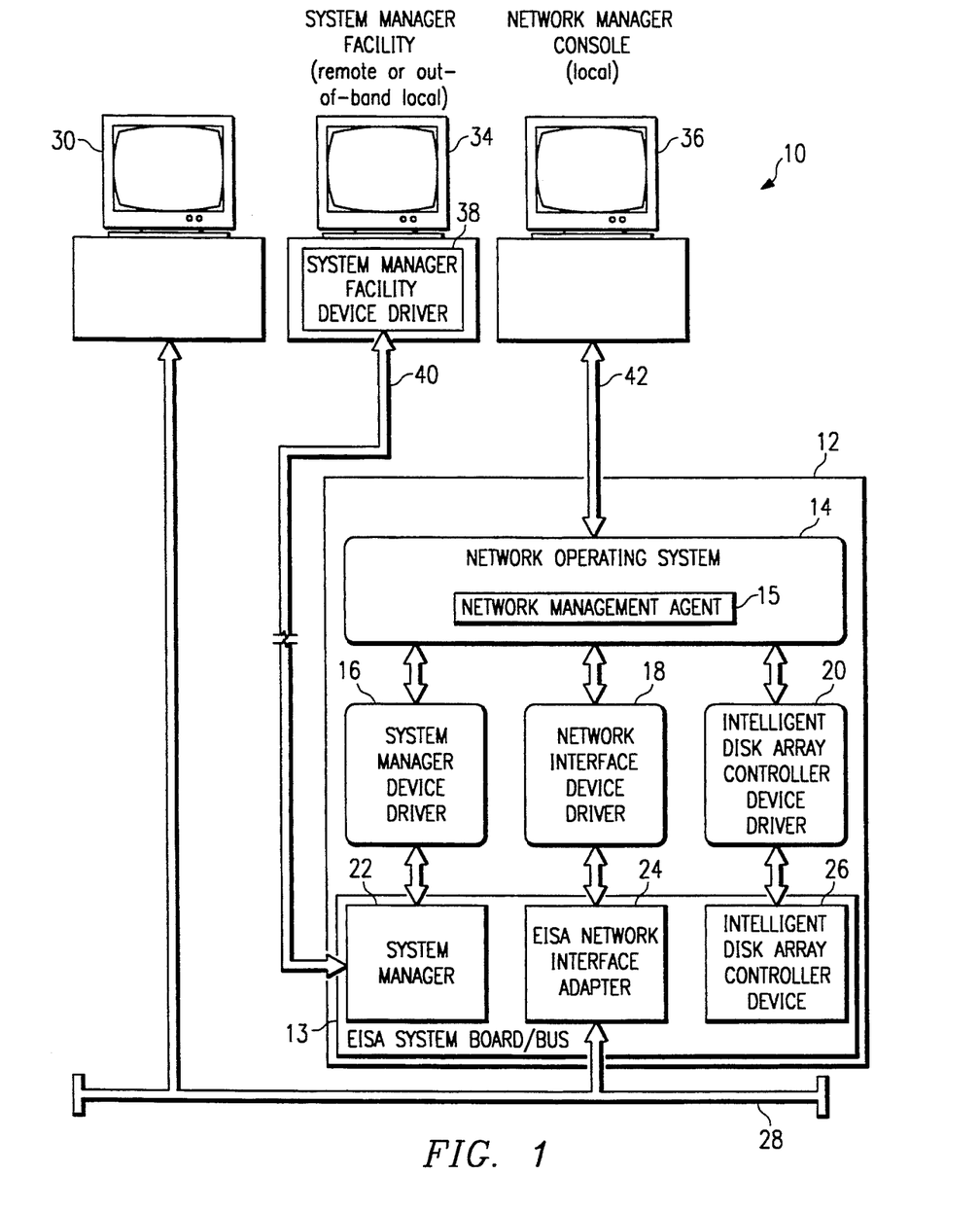
FIG. 1 is a block diagram of a computer network having an EISA based computer system and a computer system manager constructed in accordance with the teachings of the present invention installed therein.

Referring first to FIG. 1, an extended industry standard architecture (or "EISA") based computer network 10 having a system manager 22 constructed in accordance with the present invention shall now be described in detail. The computer network 10, which may be configured as either a LAN, WAN, or other type of network configuration, includes an EISA server 12, for example, a Systempro Model 486-840 manufactured by Compaq Computer Corp. of Houston, Tex., having an EISA based computer system board comprised of a series of computer subsystem (not shown) interconnected by a EISA based system bus. As the computer subsystem themselves are not specifically illustrated herein, the EISA computer system beard and EISA system bus are, for ease of illustration, indicated as a unified element, EISA system board/bus 13, although all specific references to such element shall specifically indicate which portion of the unified element is being considered in such reference.

Installed on the EISA computer system board 13 are a plurality of cards which include the system manager 22, which, as will be more fully described below, is comprised of a 32 bit intelligent bus master board and supporting firmware, an EISA network interface adapter 24 and an intelligent disk array controller device 26. Installed in the operating system (or "OS") section of the EISA server 12 is a network operating system 14, preferably one which includes a network management agent 15. It is contemplated that any one of numerous network operating systems, for example, the NetWare or LAN Manager network operating systems previously described, would be suitable for use as the network operating system 14.

Interfacing the system manager 22 and the network operating system 14 is a system manager device driver 16. The system manager device driver 16 acts as a bi-directional translator for all requests to and from the system manager 22, thereby providing two-way communication between the system manager 22 and the network management agent 15. Through this interconnection between the system manager 22 and the network management agent 15, the network management agent 15 may supply information to or receive information collected by the system manager 22. Object management by the system manager 22 may, therefore, be initiated by the network management agent 15 if the network management agent 15 issues instructions to create, delete, modify, reset, or clear objects stored in the system manager 22.

The system manager device driver 16 will also handle certain in-band and out-of band alerts. If generated by the system manager 22, an in-band alert will be transmitted by the system manager device driver 16 to the network operating system 14 which, under the control of the network management agent 15, will direct the in-band alert to a local network manager console 36 connected to the network operating system 14 by in-band network bus 42. Out-of-band alerts generated by the network operating system 14, on the other hand, will be transmitted by the system manager device driver 16 to the system manager 22 for transmission to a remotely located system manager facility 34 connected to the system manager 22 via an asynchronous link 40, for example, a telephone connection. Two-way communication between the system manager 22 and the remotely located system manager console is provided by a system manager facility device driver 38. While there are additional signals transmitted between the system manager 22 and the network operating system 14 by the system manager device driver 16, these additional signals shall be discussed in greater detail later.

The network management agent 15 also operates as a central collection point for network management information for the EISA server 12 by acting as a link between the system manager 22, other cards installed on the computer system board 13, and the computer network itself. For example, in the embodiment of the invention illustrated in FIG. 1, an EISA network interface adapter 24, for example, a Model NE3200 32-bit Ethernet adapter manufactured by Anthem Electronics, Inc., and an intelligent disk array controller device 26, are also installed on the computer system board 13. The network operating system 14 connects the computer system board 13 and, via a network interface device driver 18 which operates in a manner similar to the system manager device driver 16, the network interface adapter 24 for two-way data transmission therebetween. Furthermore, as the network interface adapter 24 is connected for two-way data transmission with the network 28, a two-way communication link between the system manager 22 and the network 28 is thusly provided. The network 28 is the interface of the network components via the network media. The network 28 may be configured in a token ring, ethernet, or other network topology in use today, to control the access of multiple computer stations to the network 28, although, in the embodiment of the invention described and illustrated herein, a single computer station 30 has been provided.

An intelligent disk array controller device driver 20 which, like the network interface device driver 18, operates in a manner similar to the system manager device driver 16, provides for two-way data transmission between the system manager 22 and, via the network operating system, the intelligent disk array controller device 26. The intelligent disk array controller device 26 provides disk storage for the computer system board 13. For example, it is contemplated that the intelligent disk array (or "IDA") controller device 26 may provide 840 Mbytes of disk storage for the computer system board 13 by associating four 210M-byte Compaq IDA drive pairs therewith.

Figure 2:
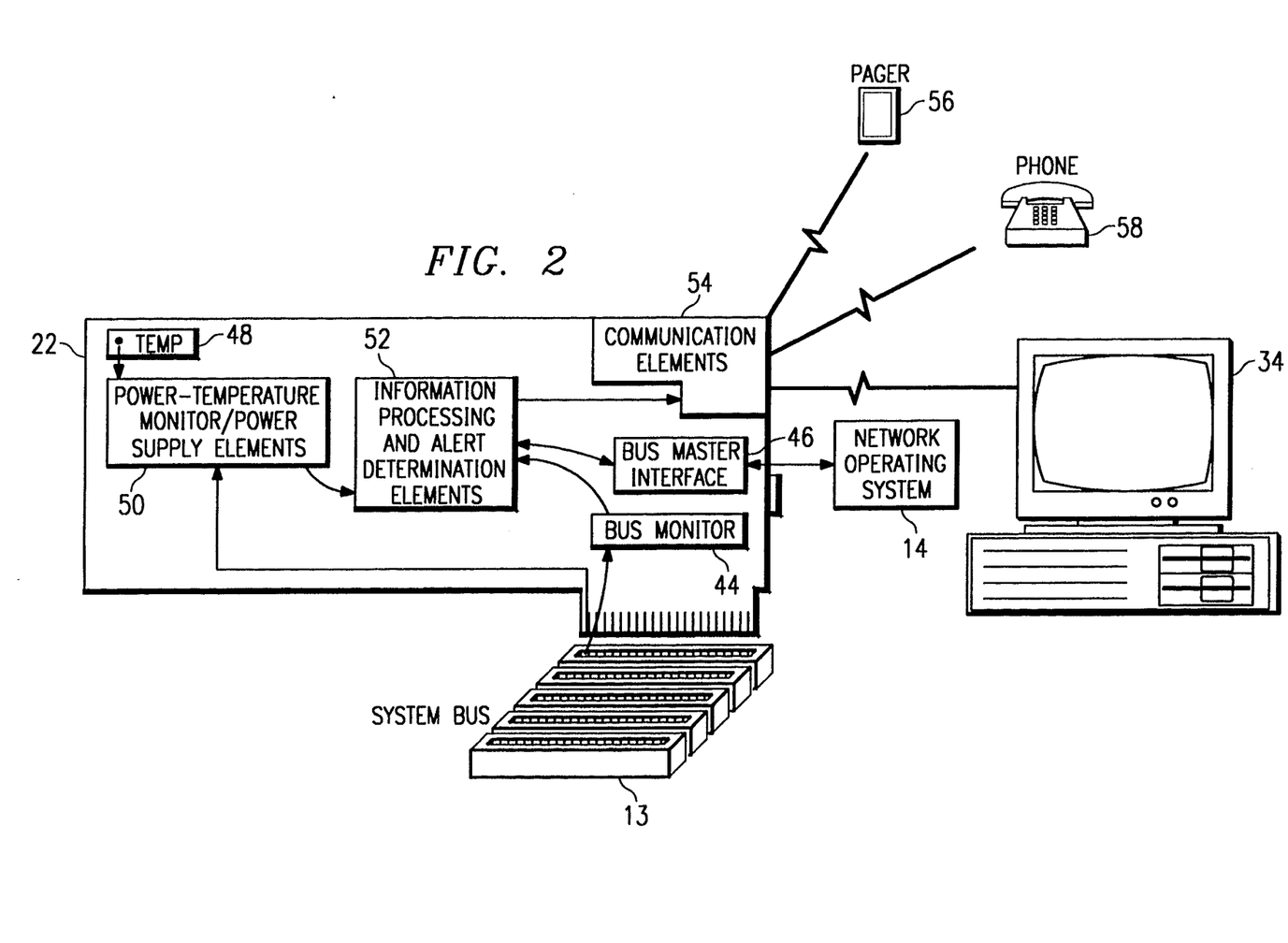
FIG. 2 is a block diagram of the system manager of FIG. 1 which illustrates information flow to and from, as well as within, the system manager.

Referring next to FIG. 2, the flow of information, most commonly in the form of data and alerts, to and from, as well as within the system manager 22 shall now be described in greater detail. As will be more fully described below, the system manager 22 has the ability to monitor various system components and parameters. If a component experiences a failure or exhibits characteristics that indicate it may experience a failure, the system manager 22 detects the failure or characteristic indicative of a potential failure and reports the failure or characteristic indicative of a potential failure as an alert in a manner such that corrective action can be taken.

As may be seen in FIG. 2, the path by which data accumulated during the monitoring of system components and parameters indicative of an actual or potential failure may be any one of four paths, depending on the particular type of actual or potential failure being monitored. Each system component being monitored may be referred to as an object having a number of attributes. As the components continue to be monitored, the value of the object's attributes may change, for example, by incrementing, decrementing, updating, resetting or modifying. When the attributes exceed their boundary or threshold value, an alert will be generated. In addition to alerts, the attributes of objects may be utilized to provide continuous real-time monitoring of the computer system board 13 without interfering with normal system operations.

Addressing the specific signals being monitored by the system bus manager 22, the computer system bus 13 supplies certain signals to a bus monitor 44 which will help determine the state of the computer system board 13. These signals include interrupt request ( or "IRQ") signals, data memory request (or "DRQ") signals and input/output (or "I/O") signals. In one embodiment of the invention, it is contemplated that the bus monitor 44 monitors the I/O signals although, in a further embodiment of the invention, it is contemplated that the bus monitor 44 monitors the supplied IRQ, DRQ and I/O signals. If the signals are active, then the corresponding system resources are being used. In this manner, these signals may be used to monitor the performance of the computer system board 13. Other signals supplied by the computer system bus 13, are utilized during object management to indicate alert conditions. For example, the absence of the refresh signal will generate an alert since the lack of refresh may cause the file server 12 to fail. Similarly, an indication of a memory parity error will cause the generation of an alert. Also innately monitored by the bus monitor 44 are the printer port, so that the system manager 22 can report whether or not there is a printer error or is out of paper, the asynchronous serial port, so that the system manager can monitor and log asynchronous activity such as overrun errors, parity errors, and framing errors for system beard serial ports, system software, so that software errors can be identified, and keyboard events, so that keystrokes can be logged and the relationship between a system failure and keyboard inputs can be analyzed. Finally, the bus monitor 44 will detect the assertion of IOCHK, indicative of a catastrophic board failure, and board "times out", indicative of a violation of EISA standards. The bus monitor 44 transfers these signals to information processing and alert determination elements 52 where the monitored information is processed. As will be more fully described below, the information processing and alert determination elements 52 of the system manager 22 is comprised of a control processor and supporting logic which, by the application of object management techniques, is configured to determine whether the monitored information warrants the generation of an alert.

The system manager 22 further provides for the monitoring of other signals for delivery to the information processing and alert determination elements 52 for potential generation of alerts. These other signals are supplied to the information processing and alert determination elements 52 by a path distinct from that previously discussed. To power the system manager 22, the computer system bus 13 provides ±5 Volt and ±12 Volt lines to a power-temperature monitor/power supply elements 50. The level of voltage supplied to the system manager 22 is converted into a digital signal by an analog-to-digital converter included in the power-temperature monitor/power supply elements 50 and the digital power level signal is provided to the information processing and alert determination elements 52. For example, if a drop in system power is detected, the information processing and alert determination elements 52 will generate an alert. If, however, a complete loss of power occurs, the system manager 22 will switch to battery power and the event reported, again as an alert, through one or both of its asynchronous modem and serial connections. This aspect of the system manager 22 is more fully described in co-pending patent application Ser. No. 07/719,394 entitled "Power Supply for a Computer System Manager" and previously incorporated by reference. Briefly, however, after loss of system power, the system manager will switch into reserve power to deliver alerts and, after completing alert delivery, to standby mode to conserve power. After reserve power is exhausted, the system manager then switches into dormant mode to keep its RAM memory valid for an extended period of time and, after the expiration of the extended period of time, cutting power off completely.

The system manager 22 is further provided with a temperate sensor 48. The internal temperature of the system manager 22 is continuously monitored by the temperature sensor 48 and the measured temperature transmitted to power-temperate monitor/power supply elements 50 where analog to digital conversion of the monitored temperature is performed. The digital temperature level is then transmitted to information processing and alert determination elements 52 for object management. If the information processing and alert determination elements 52 determine that the temperature has risen above a predetermined threshold, then an alert may be issued.

Finally, a bus master interface 46 is used to transfer certain signals from the network operating system 14 to the information processing and alert determination elements 52. Typically, the information provided by the bus master interface 46 differs from that passively supplied by the bus monitor 44 or the power-temperature monitor/power supply elements 50 in that information supplied via the bus master interface 46 are supplied as hard inputs. However, by interfacing with network operating system 14, the system manager 22 can monitor network resources other than the computer system board 13 itself. For example, in a typical network management system, the intelligent disk array controller device 26 would provide management information to the network management agent 15 such as the number of read errors that have occurred. In turn, the network management agent 15 can provide that information to the system manager 22 via the bus master interface 46.

The information passively monitored by the bus monitor 44 and the power-temperature monitor portion of the power-temperature monitor/power supply elements 50 and supplied to the information processing and alert determination elements 52, as well as that information supplied to the information processing and alert determination elements 52 by the bus master interface 46 may be used for several purposes. First, the information processing and alert determination elements 52 can process the information and, if appropriate, generate an alert. Examples of alert conditions that may be determined by information processing and alert determination elements 52 include loss of system power, server subsystem failure, excessive server temperature as well as other configurable events that require outside attention.

Once the information processing and alert determination elements 52 determine that an alert should be issued, such an alert can be issued in a number of ways. Initially, it must be determined if the alert should be delivered "in-band" or "out-of-band". Once originated by the information processing and alert determination elements 52, an in-band alert is directed to the bus master interface 46 and on to the network operating system 14 and, under the control of the network management software contained in the network management agent 15, on to the local network manager console 36. So that the use of existing network hardware is maximized, it is contemplated that in-band alerts to the local network manager console 36 will be utilized as the primary path for communications with the system manager 22. It should be specifically noted, however, that a local system manager console may be used to receive in-band alerts without departing from the practice of the present invention. If the information processing and alert determination elements 52 determine that the alert should be issued "out-of-band", the alert is transmitted to communication elements 54 where an alert is issued. As is more fully described in co-pending U.S. patent application Ser. No. 07/720,258 entitled "In-band/Out-of-band Alert Delivery System for a Computer System Manager" and previously incorporated by reference, the communication elements may send an out-of-band alert by sending a protocol message over a switched telephone connection to the system manager facility 34, by dialing a phone number associated with a pager 56 or by dialing a phone number to a phone 58 associated with a person and generating a synthesized voice message upon completing a connection with the phone 58.

In addition to alert determination and generation based upon the passively monitored information, the information processing and alert determination elements 52 also perform several other functions. More specifically, the received information is also time stamped and stored or "logged" into RAM memory for later access. Thus, in the event of a catastrophic failure of the file server 12, the monitored and logged information will be available for "post mortem" diagnostics. Similarly, network information may be transferred over the bus master interface 46 and logged into RAM memory contained within the information processing and alert determination elements 52. Finally, the objects can be transferred, for example to the remote system manager facility 34 or the local network manager console 36 to provide real-time information regarding the performance of the system manager 22.

Through the link between the communications elements 54 of the system manager 22 and the system manager facility 34, significant control of the system manager 22 can be performed from a remote location. From the system manager facility 34, remote console emulation, access to stored data and remote control or "rebooting" may be performed. Remote console emulation or "hard key insertion" permits keystrokes at the remote console to be delivered to the system manager 22 as if they were input locally. Through the hard key insertion, "soft" reboots are emulated by simultaneously inserting "control"—"alt"—"del" to actuate a reboot of the system manager 22. While not being able to actuate a complete "hard" reboot, the system manager facility 34 can simulate a hard reboot by selectively removing power from system components. More information regarding remote console emulation is set forth in co-pending U.S. patent application Ser. No. 07/719,243 entitled "Remote Console Emulator for a Computer System Manager" and previously incorporated by reference.

Figure 3:
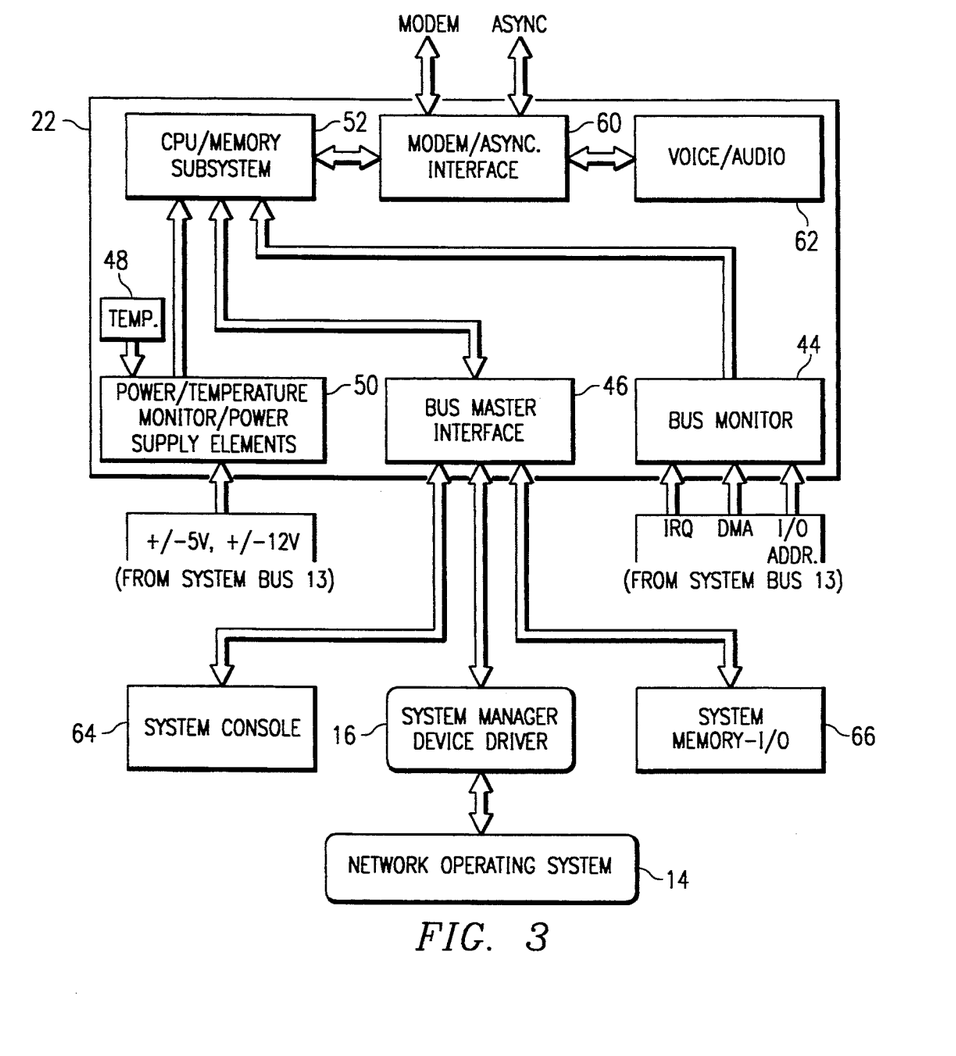
FIG. 3 is a top level block diagram of the system manager of FIGS. 1-2.

Referring next to FIG. 3, the structural configuration of the system manager 22 shall now be described in greater detail. While quite similar to FIG. 2, certain elements of the system manager 22 have now been redesignated to more closely describe their structural configurations whereas, in FIG. 2, such elements were designated with their operational characteristics closer in mind. As may be better seen in FIG. 3, the bus monitor 44 innately monitors a plurality of signals relating to the state of the computer system board 13. Innate monitoring is accomplished by the bus monitor 44 receiving all data and address signals being transferred along the system bus 13. The bus monitor 44 will then select those signals which will help determine the state of the computer system board 13 and directs the selected signals via a bus to, what previously was functionally designated as the information processing and alert determination elements 52 and what is now structurally designated as a CPU/memory subsystem 52 which is the hardware which, together with associated firmware, will perform the aforementioned information processing and alert determination functions. Other signals, indicated here as miscellaneous system signals, are always considered to help determine the state of the computer system board and are directed through the bus monitor 44 to the CPU/memory subsystem 52. Additionally, the system bus 13 supplies power to the system manager 22 via ±5 V, ±12 V lines to the power-temperature monitor/power supply element 50 and on to the CPU/memory subsystem 52. In the event of that the supply of power from the system bus 13 is terminated, the power-temperature monitor/power supply element 50 will begin supplying power from a battery included therein. The termination of the supply of power from the system bus will also be reported to the CPU/memory subsystem 52 as an alert condition.

Connected to output of the CPU/memory subsystem is a modem/asynchronous interface 60 represents the two paths along which an out-of-band alert may be transmitted, via an asynchronous communication port or via a modem, in the event that an alert condition has been established. Alert conditions include loss of system power, server subsystem failure, excessive server temperature as well as out of other events which require the attention of the system manager facility 34. Either of these may be used to report an alert condition, although the modem would typically contact either one of the pager 56 or the phone 58 while the asynchronous communication port would typically contact a remote system manager, for example the system manager facility 34 illustrated in FIG. 2. Servicing the modem/asynchronous interface 60 is voice/audio elements 62. In the event that a voice alert is selected, the voice audio elements generate the voice alert which is then transferred to a phone 58 via the modem. Finally, in the system manager configuration illustrated herein, a local system manager console 64 and system memory I/O support the system manager 22 and are accessible via the bus master interface 46.

Figure 4:
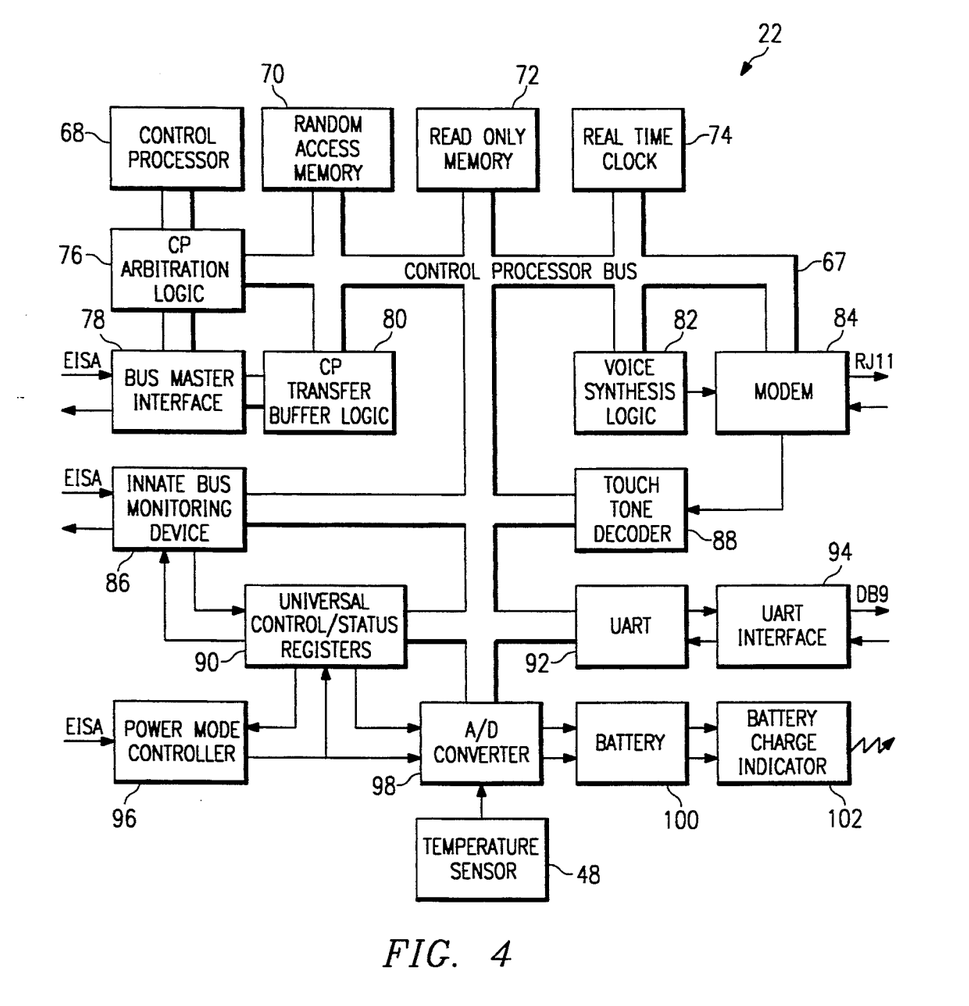
FIG. 4 is a low level block diagram of the system manager of FIG. 3.

Referring next to FIG. 4 the system manager 22 shall now be described in still greater detail. The system manager 22 is comprised of a bi-directional control processor bus 67 and a series of system manager components connected to the control processor bus 67 for the transfer of address, data and control signals between various components of the system manager 22. Connected to the control processor bus 67 are a control processor 68, random access memory 70, read only memory 72, a real time clock 74, control processor arbitration logic 76, a bus master interface 78, control processor transfer buffer logic 80, voice synthesis logic 82, a modem 84, a innate bus monitoring device 86, a touch tone decoder 88, universal control/status registers 90, a universal asynchronous receiver transmitter (or "UART") 92, a UART interface 94, a power mode controller 96, an analog-to-digital converter 98; and indirectly a battery 100 and a battery charge indicator 102 and a temperature sensor 48.

The various operations performed by the system manager 22 and the various system manager components 48 and 68-102 which are utilized to perform such operations shall now be described in greater detail. In the embodiment of the invention disclosed herein, the control processor 68 is a 16 bit microprocessor which operates at 16 MHz, although, in alternate embodiments of the invention, other microprocessor types will be suitable for use. The control process or 68 performs multiple tasks, including a primary task of collecting and storing information received from multiple sources and detecting failures based upon acquired data and issue alerts as appropriate. The control processor 68 also performs several other tasks which will be described in greater detail later. In its primary task, object data which is processed by the control processor 68 is stored in the random access memory 70 and processor instructions are stored in the read only memory 72. Depending on the particular object management performed on a particular system component, data from the computer system bus 13 and innately monitored by the innate bus monitoring device 86 may be operated on by the control processor 68 and the resultant object stored in the random access memory 70 or, depending on the particular object being managed, may be directly stored into the random access memory 70. Similarly, temperature and/or power data transmitted by the A/D converter 98 may be operated on by the control processor 68 and the result stored in the random access memory 70 or may be directly stored into the random access memory 70. The real time clock is a clock independent of the system clock which is configured to store date, time, year and other time related variables relating to objects, depending on user preference.

In "normal" operation, the control processor 68 controls the control processor bus 67 to provide data transfers between the control processor 68, the random access memory 70, the read only memory 72 and the real time clock 74. In normal operation, the control processor 68 performs object management as set forth in detail elsewhere. Based upon the acquired data, object management will provide for the detection of failures of the file server 12 or subsystem thereof.

The bus master interface 78 which, for example, may be an Intel 82355 BMIC, is configured to interrogate and modify the memory and I/O space 66 of the computer system 13 as well as the random access memory 70 of the system manager 22. For example, during a "data transfer operation" involving the system manager 22, the control processor arbitration logic 76 instructs the control processor bus 67 regarding the address, direction and destination of the data transfer. The control processor arbitration logic 76 then instructs the bus master interface 78 as to the transfer. Once the system manager 22 is ready for a transfer, the bus master interface 78 will then instruct the computer system bus 13 to arrange for a burst transfer of data to the bus master interface 78 which, in turn, will transfer the data, to the control processor transfer buffer logic 80 and on to the random access memory 70 for storage. Transfer of data from the random access memory 70 to the bus master interface 78 is accomplished in reverse manner.

Once, object management within the control processor 68 has indicated that an alert should be generated, the control processor 68 controls the delivery of the appropriate alert message via the modem 84, the UART 94 and/or the network operating system 15. The UART 94 provides an asynchronous interface between the system manager 22 and the system manager facility 34. Through a software interface provided between the UART 94 and the system manager facility 34, for example, by use of the Windows software, the system manager facility 34 is capable of reading monitored object values from and writing object control to the system manager 22. Likewise, video screen data can be transmitted from the system manager 22 to the remote console and keystrokes can be transmitted from the system manager facility 34 to the system manager 22. The system manager facility 34 also keeps alert logs. Finally, another function of the UART 94 is to connect an external modem to deliver page alerts under the control of the control processor 68.

As previously mentioned, alerts delivered to the pager 54 or the phone 56 are made via the modem 84 under the control of the control processor 68. When, however, an alert message is delivered to the phone 56, the voice synthesis logic 82 is utilized by the control processor 68 in order to generate an audible, voice alert. Pre-recorded voice messages are stored within the voice synthesis logic 82. These voice messages, which are stored in accordance with adaptive differential pulse code modulation, relate to a multitude of messages which may be accessed by the control processor and transmitted. For example, dates, numbers, alert conditions, names, voltages which correspond to the information useful to identify the type, severity, time of, location, or other identifying information regarding alert conditions. Thus, if the control processor desired to transmit a voice alert, the control processor 68 would instruct the voice synthesis logic 82 to supply the selected message to the modem 84, which, for example may be a 2400 bit per second modem, can transmit the selected message over its two way interface with the phone 58. After the alert has been transmitted, the modem 84 will await a return call through which it will pass server information and control.

The touch tone decoder 88 is connected to accept analog signals from the modem 84. The touch tone decoder 88 decodes signals received by the modem and informs the control processor as to the nature of the signal. Most commonly, the touch tone decoder will be used to provide security for the system manager 22. For example, when a alert delivery is sent via the modem 84 to a pager 56 or a phone, a user receiving the alert will, in many situations, desire to contact the system manager 22 for additional information. For example, if the user transmits a password to the modem 84, the touch tone decoder 88 will decode the tones and transmit the decoded tones to the control processor 68. The control processor 68 then decides whether the password is legitimate. As will be more fully described in copending application Ser. No. 07/719,243, entitled "Remote Console Emulator for System Bus Manager", and previously incorporated by reference, the touch tone decoder 88 is also utilized in connection with remote console emulation operations.

The power mode controller 92 both controls the power for the system manager 22 and monitors the power level for the system board. In a manner more fully described in co-pending application Ser. No. 07/719,394, entitled "Power Supply Controller for Computer System Manager", and previously incorporated by reference, the power mode controller will control the operation of the system manager 22 by designating which of alternate power modes the system manager 22, or in accordance with the requirements of certain power modes, which components of the system manager 22 are to be supplied power. In the event that power from the system bus 13 is unavailable, the battery 100 shall supply power to either the system manager 22 or to selected components thereof. As the battery 100 is rechargeable, the battery charge indicator 102 is provided to indicate when the battery 100 is being rechargeable. For example, the power mode controller 92 will cause the system manager 22 to activate the battery 100 should the supply voltage needed to operate the system manager 22 fall below a minimum operating voltage. The power mode controller 92 will also turn on and off devices not needed during operation of the battery 100. This circuitry will provide the best use of the battery 100 in this low power mode. After the processor delivers an alert, the power mode controller 92 will turn off the power to the control processor 68. The processor will be restarted when a call is detected, UART activity, expiration of set interval in real time clock and other system activity or subsystem activity.

Figure 5:
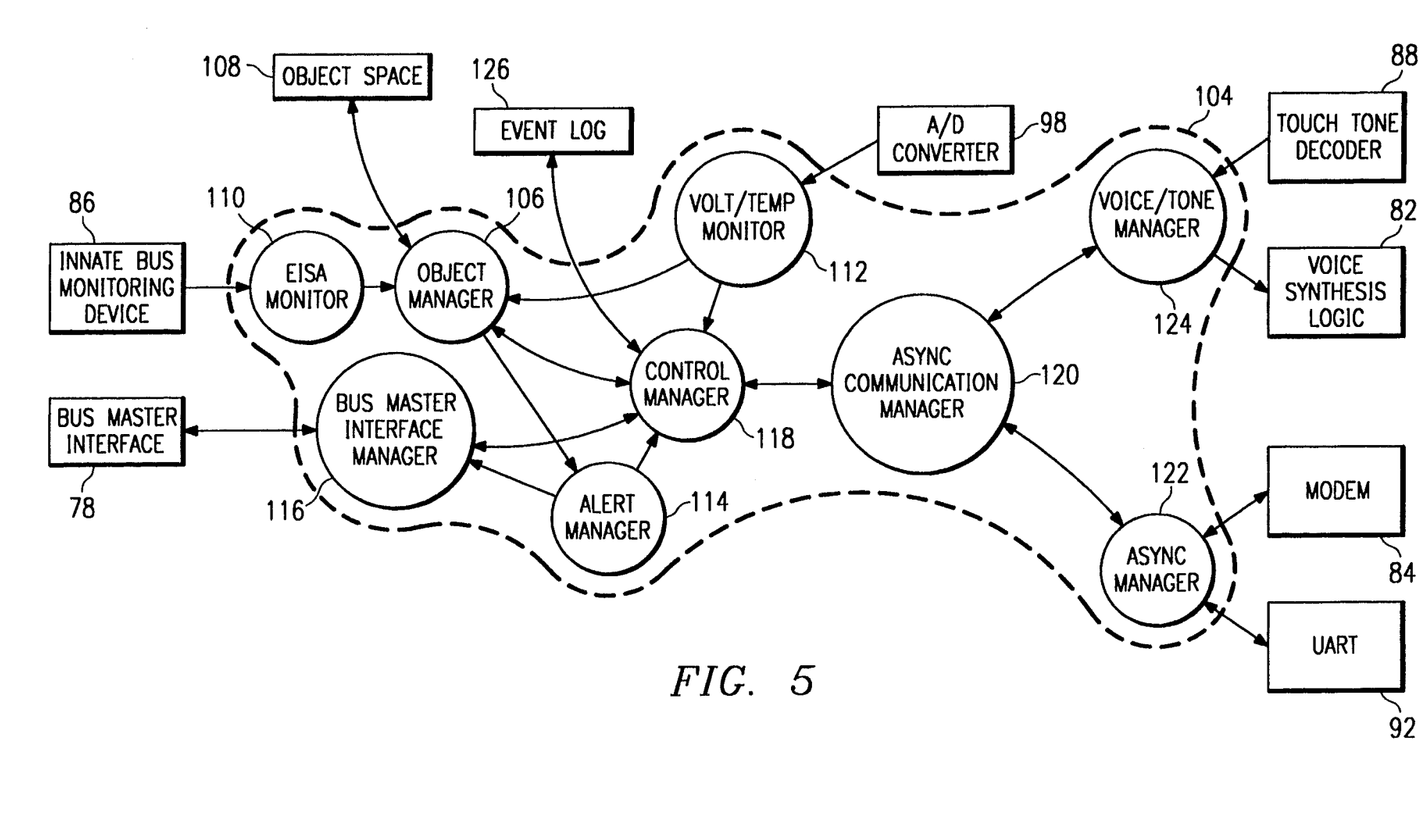
FIG. 5 is a flow diagram of the dataflow between the hardware and software components of the system manager of FIGS. 1-3.

Referring next to FIG. 5, the flow of data between the various hardware and firmware components of the system manager 22 shall now be described in greater detail. System manager occurs within the control processor 68 by the interact/on of the control processor firmware 104 with the control processors random access memory 70 as well as certain other hardware elements. In a manner to be more fully described below, the system manager firmware 104 acts upon inputs from the bus master interface 78 and the UART 94, monitors parameters of the system beard 13 being input by the innate bus monitoring device 86, monitors temperature and power parameters of the system board 13 being input by the A/D converter 98, and, as deemed necessary, generate alerts via the bus master interface 78 and/or the UART 94.

The system manager 22 operates based upon the concept of object management. Each object represents a system component that can be managed and contains pertinent information about the component that it represents. As changes occur that affect the status of a component, the information contained in the corresponding object is updated. Objects and/or data related to objects are input to the system manager firmware 104, processed therein, and stored in an object space 108 located within the random access memory 70. The object space 108 is managed by an object manager 106 which receives object messages from the bus master interface 78, the UART 94, and, in the case of innate objects updates, from within the system manager firmware 104 itself.

More specifically, an EISA monitor 110, in conjunction with programmable hardware within the innate bus monitoring device 86, selectively listens to bus activity. As events are detected, the EISA monitor 110 provides information relating to the object manager for updating the innate objects corresponding to the event. Similarly, the voltage/temperature monitor 112 periodically monitors the ±5, ±12 voltages supplied to the system bus manager 22 by the system bus 13 and updates the innate objects corresponding to power and temperature. In the event of a loss of power from the system bus 13, however, the voltage/temperature monitor 112 will report a power event directly to a control manager 118.

For each update, increment or decrement, the object manager 106 will, in the event that a boundary or threshold has been exceeded, determine that an alert needs to be issued. The object manager 106 will then request that an alert manager 114 compose an appropriate alert message and transmit the composed message. If the composed alert message is to be an in-band alert, the alert message is sent to a bus master interface manager 116 and, if the composed alert message is to be an out-of-band alert, the alert message is sent to the control manager 118. The control manager 118 would then forward the out-of-band alert to an asynchronous communication manager 120. The asynchronous communication manager 120 acts a traffic controller between the various tasks to be performed by the system manager firmware 104 and an asynchronous manager 122 which provides the firmware interface between the system firmware 104 and both the modem 84 and the UART 94. For example, if a voice message is to be generated for the out-of-band alert, the asynchronous communication manager 120 would interface with a voice/tone manager 124 which, like the asynchronous manager 122, provides the firmware interface between the system firmware and the voice synthesis logic 82 and the touch tone decoder 88. Thus, during the out-of-band alert delivery, the asynchronous communication manager 120 would transfer the alert message, as well as any voice message to accompany and/or comprise the alert, to the asynchronous manager 122 which would then deliver the alert message, either via the modem 84 or the UART 94.

Finally, in addition to delivering out-of-band alert messages originating with the alert manager 114 to the asynchronous communication manager 120, the control manager 118 performs several other functions. First, in the event of critical event occurrences, such as loss of power or failure to communicate with the system 13, the control manager will directly generate out-of-band alert messages. Second, the control manager serves to monitor significant events monitored by other managers, log events in an event log 126 which, like the object space 108, is located within the random access memory. 70, and provide logged information as requested. Logged information can be requested by the bus master interface manager for transfer, via the bus master interface to the network operating system 14 and by the asynchronous communication manager 120 for transfer via the asynchronous manager 122 to the UART 94.

Thus, there has been described and illustrated herein, a manager for a computer system operable within a computer network which provides significant system management capability and, which may also operate in conjunction with the network manager to provide still greater management capabilities. Rather than attempting to manage through the use of hard inputs delivered from the network, in the present invention, management is provided by the innate monitoring signals within the system computer itself and processing objects which correspond to the innately monitored signals and which are considered to be indicative of conditions within the computer system. Through object management, the system manager determines alert conditions based upon the innately monitored and processed objects, reports alert conditions in either an in-band mode which takes advantage of the computer network or an out-of-band mode in which the alert message is asynchronously transferred to a remote console from which corrective action may be taken. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A computer network comprising:
   a file server having a computer system board with a system bus installed therein;
   at least one computer station having a console;
   a network connecting said at least one computer station to said file server;
   a network operating system for controlling information transfers between said file server and said at least one computer station via said network; and
   a system manager for managing said computer system board, said system manager comprised of:
   external operating condition monitoring means for collecting information related to at least one external operating condition;
   a monitoring device connected to said system bus, said monitoring device receiving a plurality of signals transferred along said system bus;
   a control processor connected to said monitoring device;
   said external operating condition monitoring means and said monitoring device connected to said control processor; and
   a memory connected to said control processor, said memory storing a plurality of objects and a threshold value for each of said objects;
   each of said plurality of signals received by said monitoring device and said at least one external operating condition monitored by said external operating condition monitoring means corresponding to one of said plurality of objects stored in said memory;
   said system manager managing said computer system board by transferring said object related signals received by said monitoring device and said object related information monitored by said external monitoring means to said control processor, said control processor updating said corresponding ones of said objects stored in said memory with said received object related signals and information, determining a first alert condition when one of said updated objects exceeds said threshold value for said object and generating a first alert upon determination of said first alert condition.

2. A computer network according to claim 1 wherein said external operating condition monitoring means further comprises means for supplying power to said computer system board, means for monitoring a voltage level for power supplied to said computer system board, and means for transferring monitored voltage level to said control processor, said system manager further managing said computer system board by monitoring the level of voltage supplied to said computer system board, updating a voltage level object stored in said memory, determining a second alert condition when said updated voltage level object exceeds a voltage level threshold value and generating a second alert upon determination of said second alert condition.

3. A computer network according to claim 1 wherein said external operating condition monitoring means further comprises means for determining the operating temperature of said computer system board and means for transferring the determined operating temperature of said computer system board to said control processor, said system manager further managing said computer system board by monitoring the operating temperature of said computer system board, updating a temperature level object stored in said memory, determining a second alert condition when said updated temperature level object exceeds a temperature level threshold value and generating a second alert upon determination of said second alert condition.

4. A computer network according to claim 1 and further comprising:
   a remote console;
   an asynchronous interface between said remote console and said system manager, said system manager capable of transmitting generated alerts to said remote console via said asynchronous interface.

5. A computer network according to claim 1 and further comprising an interface connecting said network operating system and said system manager, said network operating system transferring signals to said system manager via said interface, said control processor updating corresponding ones of said objects stored in said memory with said signals supplied by said network operating system, determining a second alert condition when one of said updated objects exceeds said threshold value for said object and generating a second alert upon determination of said second alert condition.

6. A computer network according to claim 5 and further comprising a local console connected to said network, said system manager further comprising means for transmitting said first and second alerts to said local console via said network operating system as first and second in-band alerts, respectively.

7. A computer network according to claim 6 and further comprising:
   a remote console;
   an asynchronous interface between said remote console and said system manager, said system manager further comprising means for transmitting said first and second alerts to said remote console via said asynchronous interface as first and second out-of-band alerts, respectively.

8. A computer network according to claim 7 and further comprising a modem for interfacing said system manager and a remote device via a telephone line, said system manager further comprising means for selectively transmitting said first and second alerts to said remote console via said asynchronous interface or said remote device via said modem as said first and second out-of-band alerts, respectively.

9. For a computer network having at least one computer system operable therein, said computer system having a plurality of components interconnected by a system bus for transferring information between said components, a manager for said computer system, comprising:
   means for monitoring information transfers along said system bus;
   a processor connected to said monitoring means;
   means for providing information related to at least one external operating condition to said processor;
   said processor determining alert conditions comparing said monitored information transfers and said provided information to corresponding threshold values and generating a first alert upon determining that a monitored information transfer exceeds said threshold value for said monitored information transfer and generating a second alert upon determining that said provided information exceeds said threshold value for said provided information;
   a console for receiving alerts from said processor; and
   means for transferring said alerts generated by said processor to said console.

10. A system manager according to claim 9 wherein said computer network further comprises a network manager and said system manager further comprises:
    means for interfacing with said network manager, said interfacing means providing for the transfer of information from said network manager to said processor;
    said processor determining further alert conditions by comparing said information transferred from said network manager to corresponding threshold values and generating a third alert upon determining that said information transferred from said network manager exceeds said corresponding threshold value.

11. A system manager according to claim 9 wherein said means for providing information regarding at least one external operating condition to said processor further comprises:
    means for monitoring the level of voltage supplied to said system manager by said system bus, said power monitoring means transferring said monitored power level to said processor;
    wherein said processor determines said alert condition based upon said monitored system bus information transfers and said monitored power level.

12. A system manager according to claim 11 wherein said power level monitoring means further comprises:
    a power monitor having an input connected to said system bus and an output, said power monitor measuring, in analog, the level of voltage supplied to said system manager by said system bus and outputting said measured power level; and
    an analog to digital converter having an input connected to said power monitor output and an output connected to said processor, said analog to digital converter converting said measured analog power level to a digital power level and outputting said digital power level to said processor.

13. A system manager according to claim 9 wherein said means for providing information regarding at least one external operating condition to said processor further comprises:
    means for monitoring the operating temperature of said system manager, said temperature monitoring means transferring said monitored temperature level to said processor;
    wherein said processor determines said alert condition based upon said monitored system bus information transfers and said monitored temperature level.

14. A system manager according to claim 13 wherein said temperature level monitoring means further comprises:
    a temperature monitor mounted to said system manager and having an output, said temperature monitor measuring, in analog, the operating temperature of said system manager and outputting said measured temperature level; and
    an analog to digital converter having an input connected to said temperature monitor output and an output connected to said processor, said analog to digital converter converting said measured analog temperature level to a digital temperature level and outputting said digital temperature level to said processor.

15. A system manager according to claim 9 wherein said console is remotely located and said means for transferring said alerts generated by said processor to said console further comprises interface means for asynchronously transferring said alerts to said remote console.

16. A system manager according to claim 15 wherein said computer network further comprises a network manager and a local console accessible to said network manager via said network, and wherein said system manager further comprises:
    means for interfacing with said network manager, said interfacing means providing for the transfer of alerts from said processor to said network manager;
    wherein said alerts generated by said processor may be selectively delivered to said remote console via said asynchronous transfer means or to said local console via said network manager.

17. A system manager according to claim 15 wherein said system manager further comprises a telephone and said means for transferring alerts further comprises a modem connected to said processor, wherein said alerts generated by said processor may be selectively delivered to said remote console via said asynchronous transfer interface means or to said telephone via said modem.

18. A system manager according to claim 15 wherein said system manager further comprises a pager and said means for transferring alerts further comprises a modem connected to said processor, wherein said alerts generated by said processor may be selectively delivered to said remote console via said asynchronous transfer interface means or to said pager via said modem.

19. A system manager for a computer system having a plurality of system components and a system bus for transferring information between said components, comprising:
- an object space, said object space having a plurality of objects stored therein;
- means for passively monitoring signals being transferred along said system bus;
- a voltage/temperature monitor for monitoring temperature of and power supplied to said system manager; and
- a processor coupled to said passive monitoring means and said object space, said processor comprising:
  - an object manager for receiving, from said passive monitoring means, said passively monitored signals; and
  - an alert manager coupled to said object manager, for composing alert messages;
  - said voltage/temperature monitor coupled to said object manager and said control manager, said voltage/temperature monitor transferring said monitored voltage and temperature information to said object manager for performing updates to voltage and temperature objects and notifying said control manager if power is interrupted for generation of an alert;
  - said object manager updating one of said objects within said object space using said received passively monitored signals, comparing said updated object to a threshold value and issuing an alert request to said alert manager if said updated object exceeds said threshold value: and
  - a control manager coupled to said alert manager, said control manager transmitting alert messages composed by said alert manager to a first receiving unit coupled with said system manager.

20. A system manager according to claim 19 wherein said alert manager composes in-band alert messages and out-of-band alert messages, said first receiving unit is asynchronously coupled with said system manager, said control manager transmitting said out-of-band alert messages composed by said alert manager to said first receiving unit and wherein said processor further comprises:
- a bus master interface manager coupled to said alert manager, said bus master interface manager transmitting said in-band alert messages to a second receiving unit physically coupled with said system manager.

21. A system manager according to claim 20 wherein said control manager is further coupled to said object manager and wherein said system manager further comprises an event log coupled to said control manager, said control manager storing object-related events in and reading object-related events from, said event log.

22. A computer network comprising:
- a file server having a computer system board with a system bus installed therein;
- at least one computer station having a console;
- a network connecting said at least one computer station to said file server;
- a network operating system for controlling information transfers between said file server and said at least one computer station via said network;
- means for supplying power to said computer system board;
- means for monitoring a voltage level for power supplied to said computer system board;
- means for determining operating temperature for said computer system board;
- a system manager for managing said computer system board, said system manager comprising:
  - a monitoring device connected to said system bus, said monitoring device receiving a plurality of signals transferred along said system bus;
  - a control processor connected to said monitoring device;
  - a memory connected to said control processor, said memory having a first plurality of objects, a second plurality of objects, a voltage level object and a temperature level object stored therein;
  - each of said plurality of signals received by said monitoring device corresponding to one of said plurality of first objects stored in said memory;
  - an interface connecting said network operating system and said control processor, said network interface receiving a plurality of signals from said network operating system, each of said signals received by said network operating system corresponding to one of said plurality of second objects stored in said memory;
- means for transferring said plurality of signals received by said monitoring device, said plurality of signals received by said network interface, said level of voltage supplied to said computer system board and said operating temperature of said computer system board to said control processor;
- said control processor further comprising:
  - means for updating said first and second plurality of objects stored in said memory using said corresponding ones of said plurality of signals received from said monitoring means and said network interface, respectively;
  - means for updating said voltage level object stored in said memory with said supplied voltage level;
  - means for updating said temperature level object stored in memory with said supplied temperature;
  - means for determining an alert condition when one of said updated voltage level, temperature level, first plurality and second plurality of objects exceeds a corresponding threshold value; and
  - means for generating an alert upon determination of said alert condition.

* * * * *